Feb. 6, 1934.  M. I. SEILER  1,946,416
GLAZE CUTTER
Filed Dec. 2, 1931

INVENTOR
M. I. Seiler
BY
ATTORNEY

Patented Feb. 6, 1934

1,946,416

UNITED STATES PATENT OFFICE 1,946,416

GLAZE CUTTER

Michael I. Seiler, Millersburg, Pa., assignor to Keystone Reamer & Tool Co., Millersburg, Pa., a corporation of Pennsylvania Application December 2, 1931. Serial No. 578,601

2 Claims. (Cl. 29—78)

This invention relates to roughing cutters and, among other objects, aims to provide a greatly improved glaze cutting tool for valve seats and the like. The main idea is to produce a tool of this kind adapted to remove a hard, rough or smooth glaze by filing action so as to produce a fairly smooth finish and, at the same time distribute the wear over a great number of file-like teeth.

Other aims and advantages of the invention will appear in the following description when considered in connection with the accompanying drawing, wherein.

Figure 1:
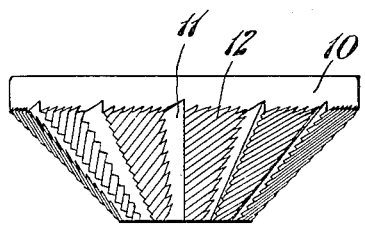
Fig. 1 is a side elevation of a cutter embodying the invention.
Figure 2:
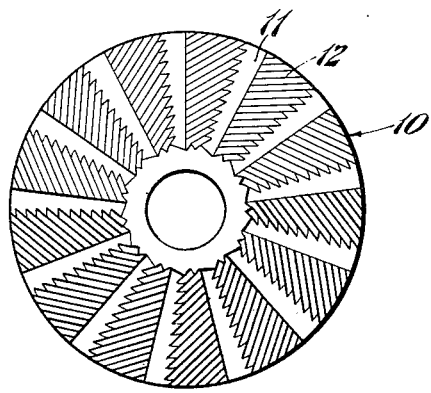
Fig. 2 is a bottom plan view.

Heretofore, it has been customary to remove the hardened surface or glaze on valve seats of internal combustion engines either by means of a file or by a roughing reamer, so that a finishing reamer may be employed to produce a uniformly smooth and accurate finish. While the hand filing method is quite practicable, it involves a great deal of labor. In some cases, however, the file cuts are made to deep at different points, requiring that relatively deep cuts be taken by the finishing tool. It has been found that ordinary roughing reamers or cutters having nicked blades have a tendency to cut too deeply into the valve seats and remove too much metal. Furthermore, the nicked blades wear out very quickly because they present corners which are knocked off or chipped when they come in contact with the relatively hard glaze on the seats. This invention therefore aims to provide a rotary cutting tool which has all of the desirable characteristics of a file and which will produce a fairly smooth finish on glazed valve seats without biting too deeply into the metal. Also, it contemplates the provision of a tool of this character which is not readily worn out or dulled.

Referring particularly to the drawing, there is shown what is known as a universal cutter comprising a shell or body 10 having a frusto-conical working face of such size as to fit the valve seats of practically all makes of automobiles. In this instance, the working face of the shell has a series of substantially radial, angular grooves 11 somewhat similar to the flutes of a reamer. However, these grooves are spaced to divide the working face of the tool into a series of segmental faces or lands of conical contour. The rear face of each groove or flute is preferably formed so that it lies in a radial plane.

In accordance with this invention, each of the segmental lands on the working face of the tool is milled to provide a series of relatively fine file-like teeth 12 arranged at an angle to the radial grooves so as to produce a shear cut. These teeth are angular in cross-section, being formed by small V-shaped grooves or flutes. They are preferably arranged so that they tend to bite into the work or lead the tool into the work as the tool is rotated.

The cutting edges of the file-like teeth follow the curved contour of the segmental lands and are intended to cut throughout their lengths. The lands are not relieved between the radial grooves or flutes 11. Hence, the forward or leading ends of the teeth cannot take "hogging bites" into the work. The cutting is done principally by the tops of the teeth, any cutting at the leading ends of the teeth being caused by the hook or rake of the teeth made by the form cutter or reamer in cutting the radial grooves or flutes. The tops or edges of the teeth on the segments are usually at an angle of 45° with respect to the axis of valve refacing cutters.

Figure 3:
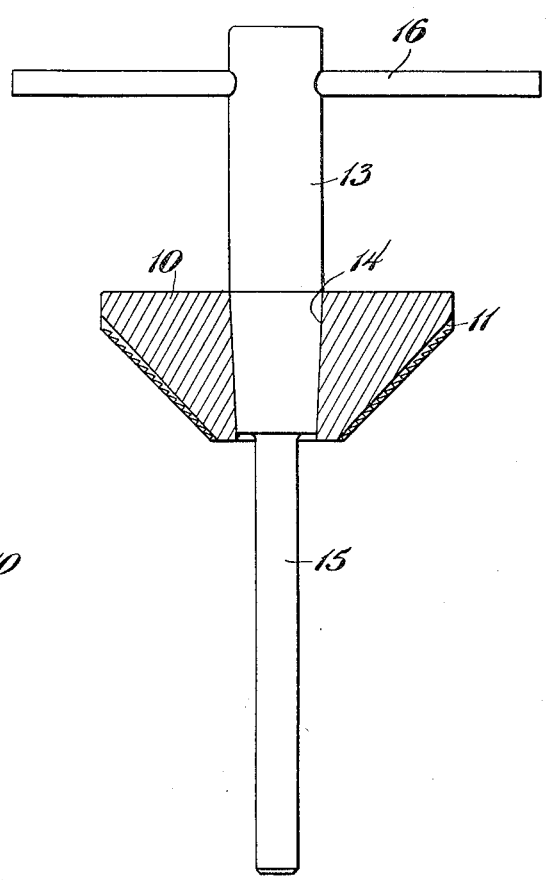
Fig. 3 is a central sectional view of the cutter showing it mounted on a combined handle and pilot.

In Fig. 3 the cutter is shown as being applied to an arbor 13 having a tapered portion 14 fitted into the tool socket and presenting an integral long pilot 15 adapted to work in the usual valve stem guide. While the tool may be operated by power, the arbor is here shown as having a handle 16 for manual operation.

From the foregoing description, it will be clear that improved cutters of this type are especially useful for refacing valve seats or for any other work wherein it is desired to remove glazed or hard surfaces. In fact, tests have demonstrated that these tools are far superior to the ordinary refacing reamers or cutters having nicked blades.

Obviously, the present invention is not restricted to the particular embodiment thereof herein shown and described.

What is claimed is:

1. A glaze cutting tool for valve seats and the like comprising a body presenting a frusto-conical working surface having a plurality of radial, V-shaped flutes dividing the working surface into a plurality of segmental lands with their leading faces normal to the axis of rotation; and a multiplicity of file teeth having cutting edges formed on the lands and disposed at an acute angle to the flutes, said cutting edges following the contour of said working surface so as to contact with the work between the flutes.

2. A rotatable cutting tool of the character described comprising a body having a frusto-conical working surface; a plurality of substantially radial flutes dividing the working surface into segmental lands having leading faces normal to the axis of rotation; and a multiplicity of V-shaped file teeth on the lands disposed at an acute angle to the flutes and having cutting edges following the curved contour of the lands, the angularity of the file teeth being such as to tend to feed the tool into the work.

MICHAEL I. SEILER.